(12) United States Patent
Helander et al.

(10) Patent No.: US 8,789,204 B2
(45) Date of Patent: Jul. 22, 2014

(54) METHOD AND APPARATUS FOR SECURE CROSS-SITE SCRIPTING

(75) Inventors: Antti Mikael Helander, Oulu (FI);
Tuomas Veli Keskitalo, Oulunsalo (FI);
Jyrki Tapani Laurila, Oulu (FI)

(73) Assignee: Nokia Corporation, Espoo (FI)

( * ) Notice: Subject to any disclaimer, the term of this patent is extended or adjusted under 35 U.S.C. 154(b) by 634 days.

(21) Appl. No.: 12/645,013

(22) Filed: Dec. 22, 2009

(65) Prior Publication Data

US 2011/0154130 A1   Jun. 23, 2011

(51) Int. Cl.
*H04L 9/32* (2006.01)
*G06F 21/51* (2013.01)
*H04L 29/06* (2006.01)

(52) U.S. Cl.
CPC ........ G06F 21/51 (2013.01); *G06F 2221/2119* (2013.01); *H04L 63/08* (2013.01); *H04L 63/168* (2013.01); *H04L 9/3226* (2013.01)
USPC .............. 726/28; 726/3; 726/4; 726/5; 726/9; 715/240

(58) Field of Classification Search
CPC . G06F 21/51; G06F 2221/2119; H04L 63/08; H04L 63/168; H04L 9/3226
USPC ................. 714/48; 726/3, 9, 13, 28; 715/240
See application file for complete search history.

(56) References Cited

U.S. PATENT DOCUMENTS

| | | | |
|---|---|---|---|
| 7,506,248 B2 | 3/2009 | Xu et al. | |
| 2004/0210536 A1 | 10/2004 | Gudelj et al. | |
| 2004/0260754 A1 | 12/2004 | Olson et al. | |
| 2005/0204041 A1 | 9/2005 | Blinn et al. | |
| 2007/0299857 A1* | 12/2007 | Gwozdz et al. | 707/102 |
| 2008/0215675 A1 | 9/2008 | Kaminitz et al. | |
| 2009/0276835 A1* | 11/2009 | Jackson et al. | 726/4 |
| 2009/0320119 A1* | 12/2009 | Hicks et al. | 726/9 |
| 2010/0049792 A1 | 2/2010 | Hao et al. | |
| 2010/0125623 A1 | 5/2010 | Rice et al. | |

OTHER PUBLICATIONS

G02me, Mckoss, Feb. 4, 2010, http://code.google.com/p/g02me/wiki/API, pp. 1-8.
Mixendo XHR: Cross-Domain Security. Accessed on Aug. 30, 2010: http://dev.mixendo.com/wiki/Mixendo_XHR_Security, pp. 1-5.
Security Mechanisms and Policy for Mandatory Access Control in Computer Systems, Wurster, 2010 http://www.ccsl.carleton.ca/people/theses/Wurster_PhD_Thesis_10.pdf, pp. 1-172.
Fielding et al., Header Field Definitions. Accessed: Mar. 22, 2010, http://www.w3.org/Protocols/rfc2616/rfc2616-sec14.html#sec14.9.

* cited by examiner

*Primary Examiner* — Jung Kim
*Assistant Examiner* — Ayoub Alata
(74) *Attorney, Agent, or Firm* — Ditthavong & Steiner, P.C.

(57) ABSTRACT

An approach is provided for providing secure cross-site scripting. A web services platform causes, at least in part, reception of an initiation request from at least a first inline frame of at least one web page. The initiation request specifies a developer identifier associated with a domain of the at least one web page. The web services platform determines a callback resource identifier based on the developer identifier. The web services platform then determines to cause, at least in part, transmission of the callback resource identifier to the at least the first inline frame for use in creation of at least a second inline frame associated with the at least the first inline frame.

20 Claims, 9 Drawing Sheets

METHOD AND APPARATUS FOR SECURE CROSS-SITE SCRIPTING

BACKGROUND

Service providers (e.g., wireless, cellular, etc.) and device manufacturers are continually challenged to deliver value and convenience to consumers by, for example, providing compelling network services. One area of development has been the combination or integration of one or more of these services into web pages for creating new and unique services, or for simply providing more convenient access to such services. For example, this integration is commonly implemented as scripts embedded into the web page's source code to access functions or application programming interfaces (APIs) corresponding to the services. However, modern browsers generally limit access for web pages and applications that execute scripts between different domains to, for instance, combine services, application, and/or content between different websites. The purpose of these limitations is to prevent malicious attackers or hackers from injecting client-side script into web pages viewed by users to prevent security risks. A malicious attacker able to execute a script on the web page may be able to control the same functions that the web page is able to control, including access to cookies and other personal information. However, these restrictions also create technical burdens on providing access to such cross-site (e.g., multi-domain) services or applications while complying the security policies and limitations of modern browsers.

SOME EXAMPLE EMBODIMENTS

Therefore, there is a need for an approach for secure cross-site scripting.

According to one embodiment, a method comprises causing, at least in part, reception of an initiation request from at least a first inline frame of at least one web page, the initiation request specifying a developer identifier associated with a domain of the at least one web page. The method also comprises determining a callback resource identifier based on the developer identifier. The method further comprises determining to cause, at least in part, transmission of the callback resource identifier to the at least the first inline frame for use in creation of at least a second inline frame associated with the at least the first inline frame.

According to another embodiment, an apparatus comprising at least one processor, and at least one memory including computer program code, the at least one memory and the computer program code configured to, with the at least one processor, cause, at least in part, the apparatus to cause, at least in part, reception of an initiation request from at least a first inline frame of at least one web page, the initiation request specifying a developer identifier associated with a domain of the at least one web page. The apparatus is also caused to determine a callback resource identifier based on the developer identifier. The apparatus is further caused to determine to cause, at least in part, transmission of the callback resource identifier to the at least the first inline frame for use in creation of at least a second inline frame associated with the at least the first inline frame.

According to another embodiment, a computer-readable storage medium carrying one or more sequences of one or more instructions which, when executed by one or more processors, cause, at least in part, an apparatus to cause, at least in part, reception of an initiation request from at least a first inline frame of at least one web page, the initiation request specifying a developer identifier associated with a domain of the at least one web page. The apparatus is also caused to determine a callback resource identifier based on the developer identifier. The apparatus is further caused to determine to cause, at least in part, transmission of the callback resource identifier to the at least the first inline frame for use in creation of at least a second inline frame associated with the at least the first inline frame.

According to another embodiment, an apparatus comprises means for causing, at least in part, reception of an initiation request from at least a first inline frame of at least one web page, the initiation request specifying a developer identifier associated with a domain of the at least one web page. The apparatus also comprises means for determining a callback resource identifier based on the developer identifier. The apparatus further comprises means for determining to cause, at least in part, transmission of the callback resource identifier to the at least the first inline frame for use in creation of at least a second inline frame associated with the at least the first inline frame.

According to one embodiment, a method comprises causing, at least in part, creation of an inline frame within a web page of a first domain associated with a developer identifier. The inline frame is associated with a second domain. The method also comprises determining to cause, at least in part, transmission of the developer identifier to a platform associated with the second domain. The method further comprises causing, at least in part, reception at the inline frame of a callback resource identifier from the platform. The callback resource identifier is determined based, at least in part, on the developer identifier. The method further comprises causing, at least in part, creation of another inline frame within the inline frame. The other inline frame is based, at least in part, on the callback resource identifier.

According to another embodiment, an apparatus comprising at least one processor, and at least one memory including computer program code, the at least one memory and the computer program code configured to, with the at least one processor, cause, at least in part, the apparatus to cause, at least in part, creation of an inline frame within a web page of a first domain associated with a developer identifier. The inline frame is associated with a second domain. The apparatus is also caused to determine to cause, at least in part, transmission of the developer identifier to a platform associated with the second domain. The apparatus is further caused to cause, at least in part, reception at the inline frame of a callback resource identifier from the platform. The callback resource identifier is determined based, at least in part, on the developer identifier. The apparatus is further caused to cause, at least in part, creation of another inline frame within the inline frame. The other inline frame is based, at least in part, on the callback resource identifier.

According to another embodiment, a computer-readable storage medium carrying one or more sequences of one or more instructions which, when executed by one or more processors, cause, at least in part, an apparatus to cause, at least in part, creation of an inline frame within a web page of a first domain associated with a developer identifier. The inline frame is associated with a second domain. The apparatus is also caused to determine to cause, at least in part, transmission of the developer identifier to a platform associated with the second domain. The apparatus is further caused to cause, at least in part, reception at the inline frame of a callback resource identifier from the platform. The callback resource identifier is determined based, at least in part, on the developer identifier. The apparatus is further caused to cause, at least in part, creation of another inline frame within the inline frame. The other inline frame is based, at least in part, on the callback resource identifier.

According to another embodiment, an apparatus comprises means for causing, at least in part, creation of an inline frame within a web page of a first domain associated with a developer identifier. The inline frame is associated with a second domain. The apparatus also comprises means for determining to cause, at least in part, transmission of the developer identifier to a platform associated with the second domain. The apparatus further comprises means for causing, at least in part, reception at the inline frame of a callback resource identifier from the platform. The callback resource identifier is determined based, at least in part, on the developer identifier. The apparatus further comprises means for causing, at least in part, creation of another inline frame within the inline frame. The other inline frame is based, at least in part, on the callback resource identifier.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing secure cross-site scripting are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
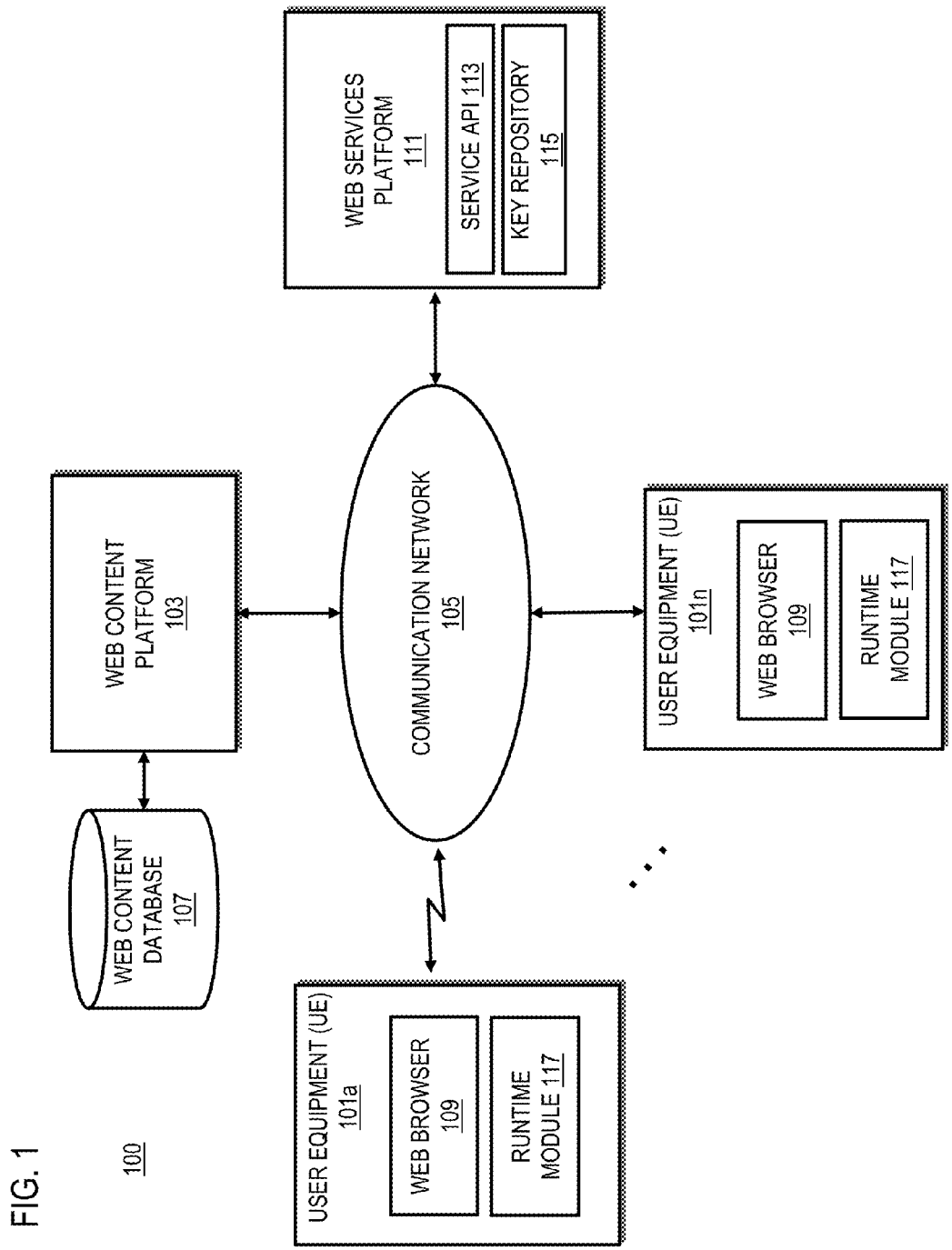
FIG. 1 is a diagram of a system capable of providing secure cross-site scripting, according to one embodiment.

FIG. 1 is a diagram of a system capable of providing secure cross-site scripting, according to one embodiment. As noted above, many modern web browsers limit the accessibility of the use of scripts (e.g., such as scripts written in asynchronous JavaScript and Extensible Markup Language (Ajax)) of a web page in one domain to other web pages or resources in another domain. This limitation is commonly known as the "same origin policy" and generally permits a script to access content or resources in a particular domain only if the script originates from the same domain. The goal of the same origin policy is to maintain a strict partition between domains to protect against potential malicious attacks and compromise of data. However, the same origin policy also makes it difficult for a web service developer to provide access to an application programming interface (API) of a web service to a web page of a different domain and be able to interact with that web service. By way of example, a web page developer may wish to interact with the web service to provide information gathered from the web service to another web service (e.g., in another portion of the web page such as an inline frame or other distinct segment). In certain embodiments, the term domain is an identification label associated with a realm of administrative autonomy, authority, or control in the internet. Further, the domain may include a top-level domain such as *.com, *.net, *.org, etc. as well as second-level (e.g., a root website name) and third-level domain names (e.g., modifier.[root]).

In one sample use case, a web page developer generates a web page that utilizes an application provided by a web services provider (e.g., via an API) associated with a different domain. Because of the same origin policy restrictions, the web page may not be able to directly use or allow use of scripts sourced at the different domain. Thus, the web page may not have direct access to all of the functionalities of the scripts associated with the other domain. Further, because the web page may not have access to the information associated with the application, the web page may not use the information associated with the application to update other parts of the web page. In other words, any other parts of the web page (e.g., referenced to the same service provider or another service provider) that might depend on the information (e.g., user login credentials obtained from the other domain) would be unable to render or otherwise use the information. Historically, other solutions to the same origin policy have been utilized, however, many of these solutions provide little security or limited cross-site messaging. As such, the service providers have only a limited set of options for stopping scripts provided to a domain or keeping certain web pages from retrieving information from the scripts using cross-site messaging.

To address this problem, a system 100 of FIG. 1 introduces the capability to provide secure cross-site scripting (XSS) by generating a developer key to bind a callback resource identifier (e.g., a callback Uniform Resource Locator (URL)) which is used for passing data, information, resources, and the like between different domains. In one embodiment, a UE 101 (e.g., any of the UEs 101a-101n) can retrieve a web page from a web content platform 103 via a communication network 105. In certain embodiments, the UE 101 is connected to the communication network 105 via a wireless connection (e.g., UE 101a) or a wired connection (e.g., UE 101n). All or a portion of the web content platform 103 may be associated with a particular web developer (e.g., an entity such as a corporation, company, person, etc.) via, for instance, one or more domains. For example, the web developer may develop content, information, services, applications, etc. for use or access as web content. This web content may be referenced or included within one or more web pages provided by the web content platform 103 and may be stored in a web content database 107.

A web browser 109 of the UE 101 is utilized to present the web content to a user. Further, the web browser 109 may be utilized to receive input, via the UE 101. The web browser 109 can retrieve, present, and traverse information resources over the World Wide Web. By way of example, the web browser 109 may utilize resource identifiers and resource locators such as uniform resource identifiers (URIs) and uniform resource locators (URLs) to navigate the World Wide Web. Further, the web browser 109 may utilize a markup language, such as HyperText Markup Language (HTML), to navigate and format web content. Examples of a web browser include Internet Explorer®, Mozilla Firefox®, Apple Safari®, and Opera®.

In one embodiment, the web browser 109 may include the browser limitations (e.g., the same origin policy) previously discussed. Accordingly, the developer of the web content platform 103 may have difficulties providing web content to the user if the web content includes information from another domain, such as a web services platform 111. The web services platform 111 may include one or more service APIs 113 to provide web content to users. Examples of services and information provided by the service API 113 may include, shopping, digital sound, songs, digital images, digital games, digital maps, point of interest information, digital videos, such as music videos, news clips and theatrical videos, advertisements, program files or objects, any other digital media or content, or any combination thereof that may be utilized in an application, web page, or other content available via the web content platform 103. A media or other content player associated with the web browser 109 may be utilized to present the content from the web services platform 111 via the service API 113. The service API 113 may be implemented via libraries provided to the developer by a service provider associated with the web services platform 111. Further, requests and responses to/from the web services platform from/to the web browser 109 can be via common interfaces (e.g., Extensible Markup Language Hypertext Transfer Protocol Request (XHR)).

To provide access to the user of the web browser 109 to the content of the services platform 111, which may include scripts, the developer may include a call to the service API 113 via an inline frame (iframe). In certain embodiments, an iframe may be part of a web document (e.g., a web page) that can be segmented from the remainder of the web document. The iframe may include another web document (e.g., an HTML document), which may be sourced from another domain (e.g., the web services platform 111). The iframe may additionally act as if it was a web document, thus, it may additionally call one or more additional iframes. To provide interactivity between the content of the iframe and the web page and/or other iframes, nested iframes can be utilized. Further, in certain embodiments when the iframes are used solely for transferring data between the iframes and the web page, one or more of the nested iframes may be presented on the web page in a manner that is not visible (e.g., as a transparent or small iframe) to the user. In this way, iframes for transferring data may be non-visible to the user.

In one embodiment, each web document (e.g., the web page and any iframe) may be referred to as a window. The windows may be organized in a tree-like manner, that is, the web page may call multiple branches of iframes associated with one or more domains, which can each also include other iframes. As such, the developer may wish to provide some or all of the information included in one iframe to another iframe. However, as noted previously, a property of the web browser 109 (e.g., the same origin policy) may specify that windows may only access the internal state of another window (e.g., the web page window or an iframe window) if the windows belong to the same domain (e.g., the web content platform domain). Thus, the scripts of one iframe may not communicate directly to the scripts of another iframe. Further, any window may refer to another window (e.g., via a handle) in its hierarchy. For example, the iframe may refer to its parent window (the web page) by calling it a parent. Further, a window (e.g., the web page) may refer to a child window (e.g., the iframe) using the handle of window.frames [name]. Name may be a reference to the window (e.g., if the parent window has 3 iframe children, the children may be named 1, 2, and 3). Further, to refer to a sibling, the window may use a handle of parent.frames[sibling]. Further, another property of the web browser 109 may specify that any window in the hierarchy can set the location of other windows' locations (e.g., URLs). However, a window may not be able to read the location of another window unless the window is associated with the same domain as the other window. Further, another property of a window, in certain embodiments, specifies that when a URL of the window is changed, the web content associated with the window is reloaded. However, the window may include a property that the window is not reloaded if the change to the URL only changes a fragment identifier. In certain embodiments, a fragment identifier includes data placed after a hash mark (e.g., #) of the URL. URLs may be information that may be accessed by other windows in the same domain. As such, fragment identifiers may be utilized to pass information between windows.

Because the purpose of the browser limitations is to provide for additional security, providing XSS on a web page may implement security measures. As such, the web services platform 111 includes a key repository 115 for associating an identifier of the developer (e.g., a developer key) with a domain associated with the developer. The developer may register with the service provider of the web services platform 111 to register as a trusted developer (e.g., a developer that is trusted to utilize XSS associated with the web services platform 111). Further, the developer may be assigned the developer key and the key repository 115 may include a binding of the developer key to a particular domain (e.g., a domain associated with a website of the web content platform 103). In certain embodiments, the developer key is an identifier of the developer that is linked to a callback resource identifier in the key repository 115. Further, the binding may include one or more callback resource identifiers or URLs that may be utilized as a bridge for communication between the web content platform 103 and the web services platform 111. In certain embodiments, the callback resource identifier is a modified or unmodified URL associated with the developer key. Optionally, the binding may include a revocation status of the developer. If the services platform 111 receives information that the developer key has been compromised or complaints about the developer, the revocation status may be set provide information that scripts should not be executed on the developer's website.

In one embodiment, the web browser 109 loads the web page of the developer from the web content platform 103. The web page is associated with a first domain. The web page includes source code that causes, at least in part, the web browser 109 to create an iframe to access content, including scripts, from the web services platform 111, which is associated with a second domain. Because the web page and the iframe are sourced from two different domains, the iframe may not directly communicate with the web page. The web browser 109 may setup communications with the service API 113 using the iframe. The setup process may include providing the web services platform 111 with the developer key, a user identifier, or a combination thereof. In certain embodiments, the user identifier may be a secure user identifier (e.g., a single sign-on (SSO) hash value). A SSO hash value may include a user identifier and a sign-on key. In certain scenarios, the user of the web content platform 103 may have pre-authenticated with the web services platform 111 to receive individualized services.

To securely allow the web services platform 111 to communicate with the web page of the web content platform 103, the web services platform 111 utilizes the callback resource identifier associated with the developer key to cause the web browser 109 to create another iframe within the iframe sourced using the domain of the callback resource identifier. As noted above, if a revocation status of the developer key provides that scripts should not be executed on the web page, the iframe may be caused to stop execution of scripts. If scripts are allowed and if the developer key callback resource identifier domain matches the web page domain, then, the other iframe may be utilized to send information from the service API 113 to the web page. As noted above, the scripts of one window may be able to communicate with the scripts of another window if the scripts of the two windows are in the same domain. In this manner, information that the service API 113 wants to present to the web page may be generated and provided in the other iframe. An exemplary manner of communication may include pseudo code in the other iframe including "window.parent.parent.receivePackage," where the receivePackage identifier includes the information. In certain embodiments, the service API 113 may include an authentication token. The authentication token may be utilized as a means for the web page to communicate with the service API 113 based on the created session. Further communications from the web page to the service API 113 may be performed in the same manner, except utilizing the token as the developer key. With the above approach, an unauthorized web page (e.g., a web page in a different domain than the domain bound to the developer key) cannot access the authentication token or the information associated with the receivePackage identifier because of the security limitations (e.g. the same origin policy) of the web browser 109 that block direct communication between two windows associated with different domains.

Once the web page has the information (e.g., a user birth day), the web page may utilize the gathered information for use in other applications (e.g., a horoscope application), player, etc. Further, the web page may call another service from another domain and provide the information as a parameter for the service. In one example, the service is a horoscope service that requires a birth date of a user to provide the service. The web page may retrieve the birth date from the service API 113 via the processes provided above and pass the birth date as a parameter within the horoscope service. Further, the web page may retrieve other information from the horoscope service (e.g., astrological compatibility information) using the approaches provided above and pass the other information to a dating application on another portion of the web page.

Figure 7:
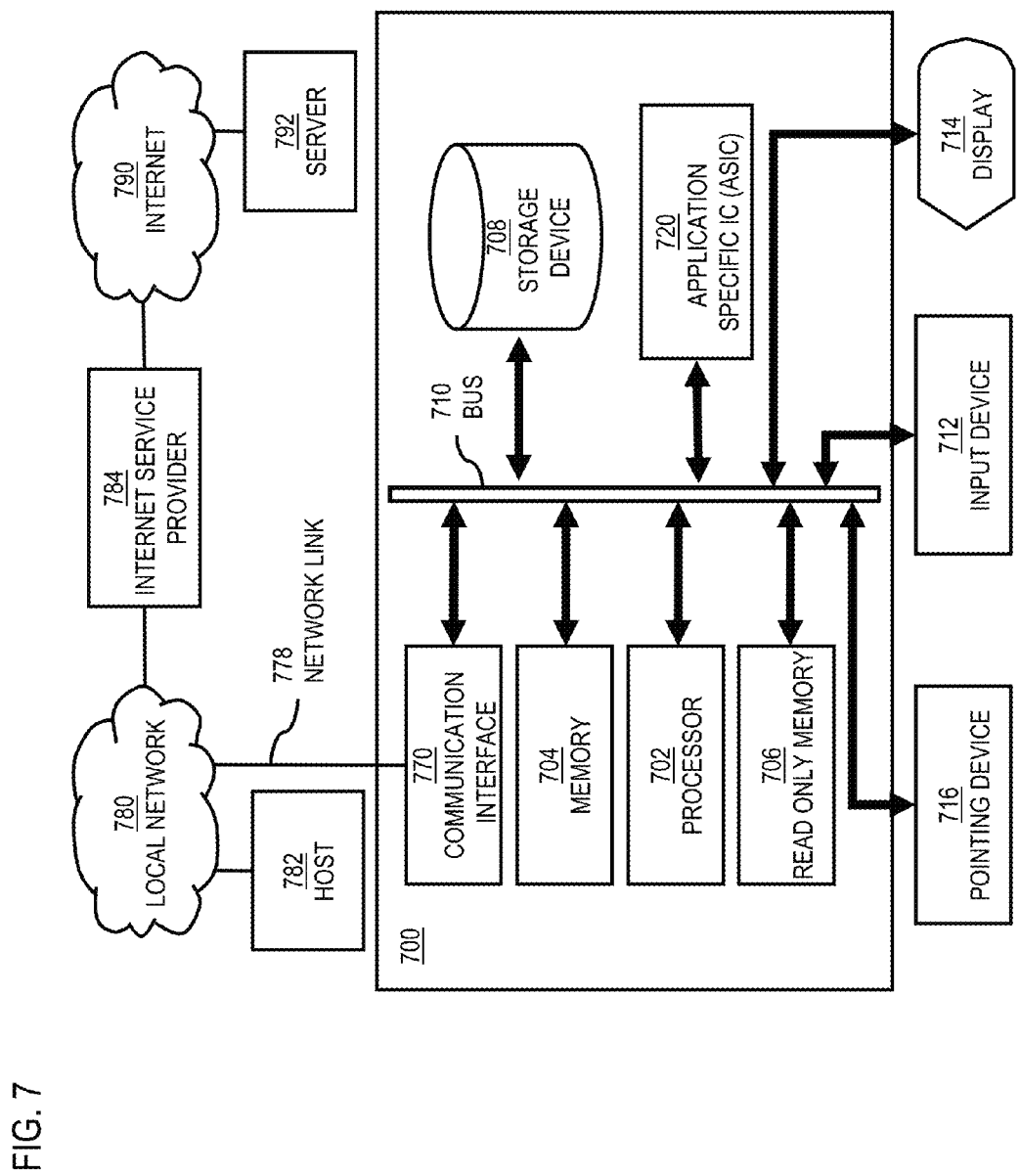
FIG. 7 is a diagram of hardware that can be used to implement an embodiment of the invention.

In one embodiment, the web content platform 103 and the web services platform 111 can be implemented via shared, partially shared, or different computer hardware (e.g., the hardware described with respect to FIG. 7). For example, the web services platform 111 may include one or more servers used in conjunction to provide a service.

As shown in FIG. 1, the system 100 comprises a user equipment (UE) 101 having connectivity to the web content platform 103 and the web services platform 111 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The web browser 109 may execute on a runtime module 117 of the UE 101 utilize a memory of the UE 101 to store browser instructions and information. The UE 101 may include a user interface to present the web browser 109 (e.g., via a graphical user interface (GUI)) and receive information to utilize the web browser 109. The user interface can include various methods of communication. For example, the user interface can have outputs including a visual component (e.g., a screen), an audio component, a physical component (e.g., vibrations), and other methods of communication. User inputs can include a touch-screen interface, a scroll-and-click interface, a button interface, a microphone, etc.

By way of example, the UE 101, web content platform 103, and web services platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
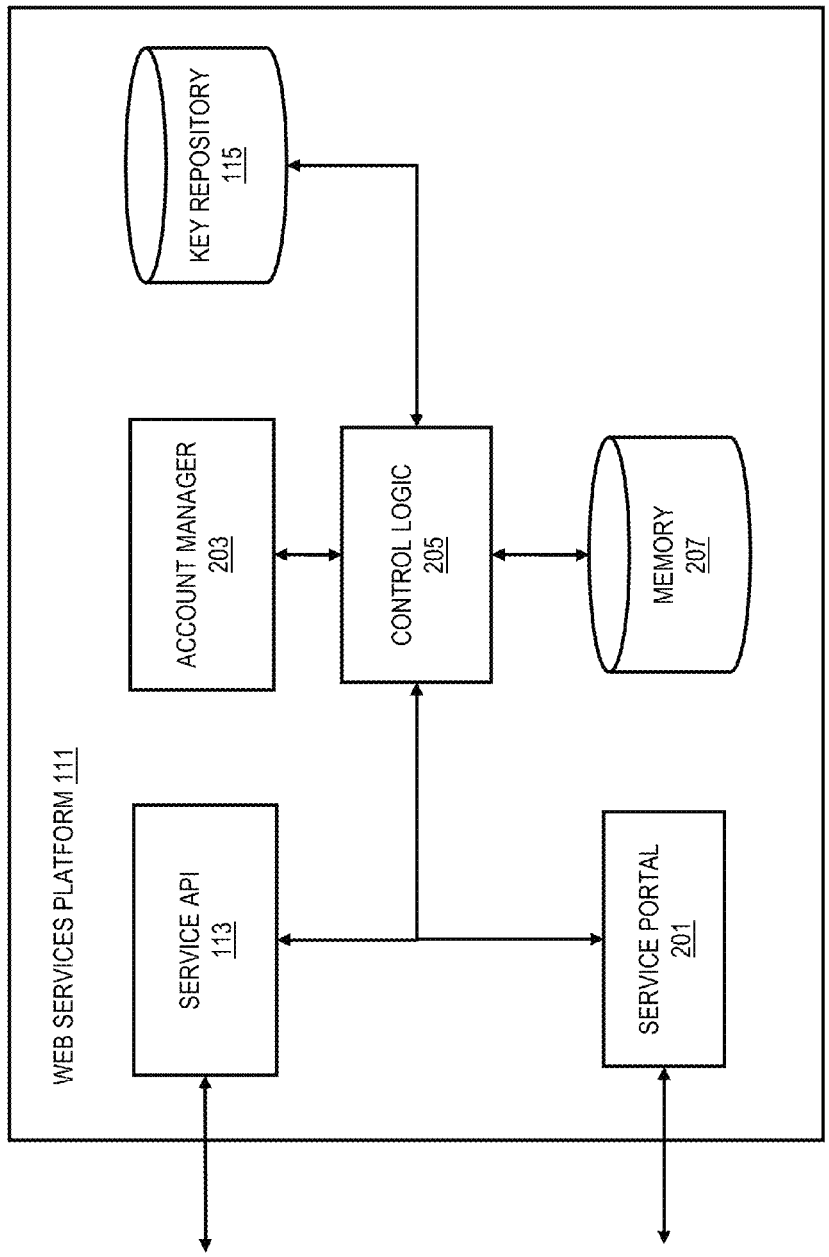
FIG. 2 is a diagram of the components of a web services platform, according to one embodiment.

FIG. 2 is a diagram of the components of a web services platform 111, according to one embodiment. By way of example, the web services platform 111 includes one or more components for providing secure cross-site scripting to a web page. It is contemplated that the functions of these components may be combined in one or more components or performed by other components of equivalent functionality. In this embodiment, the web services platform 111 includes the service API 113, the key repository 115, a service portal 201 that may provide web access to the user, an account manager 203 to supervise accounts of users, a control logic 205 to coordinate between modules, and a memory 207.

The service portal 201 may be utilized by the control logic 205 to provide a means for a user to authenticate with the web services platform 111 via the account manager 203. The account manager 203 may be utilized to store and determine authentication parameters associated with the user. The user account manager 203, for instance, manages the sharing of login credentials by tracking which of the services share login credentials and then linking the credentials to the user accounts created with the various services a particular user. By way of example, the user account manager 203 may store the tracking information for the login credentials and the user account information in the memory 207. Further, the memory 207 may include one or more processes and one or more data structures that stores information about registered users each of the services, including login credentials and related information as well as data, configurations, user profiles, variables, conditions, and the like associated with using any of the services. The user's web browser 109 may access a web page associated with the service portal 201 to provide authentication information (e.g., a user name and password) to the web services platform 111. The control logic 205 can then provide the account manager 203 with the authentication information. The account manager 203 can then associate the user to an account and further provide an authentication hash as a secure user identifier valid for a certain amount of time to the web browser 109 via the service portal 201.

As noted above, the service API 113 may be utilized to provide services to a web browser 109 and may be utilized to send and receive messages. In certain embodiments, the service API 113 may be implemented on one or more platforms (e.g., servers, computers, electronic machines etc.) and utilize a representational state transfer (REST), SOAP, Extensible Messaging and Presence Protocol (XMPP), a JavaScript API, other similar APIs, customized APIs, or a combination thereof. In certain embodiments, functions, constructs, and other information for using the service API 113 may be provided to website developers to utilize in their web pages. Data associated with the services provided by the service API 113 may be stored in the memory 207. As such, the memory 207 may include volatile memory, non-volatile memory, or a combination thereof. Further, more than one memory 207 may be utilized.

When a request to utilize the service API 113 is received, the request may include a developer key, an authentication key, an authentication token, other authentication information (e.g., the secure user identifier or a user name and password), or a combination thereof. As previously noted, the service API 113 may compare the developer key and/or authentication key to the key repository 115 to associate the service to be provided with a domain. As such, the key repository 115 may include bindings to domains and/or URLs for the developer key and/or authentication key. In certain embodiments, when a developer key is used for a session, an authentication key is generated for use during the session. The authentication key can be stored in the key repository 115 and be associated with the domain of the developer of the developer key utilized to generate the authentication key.

Figure 3:
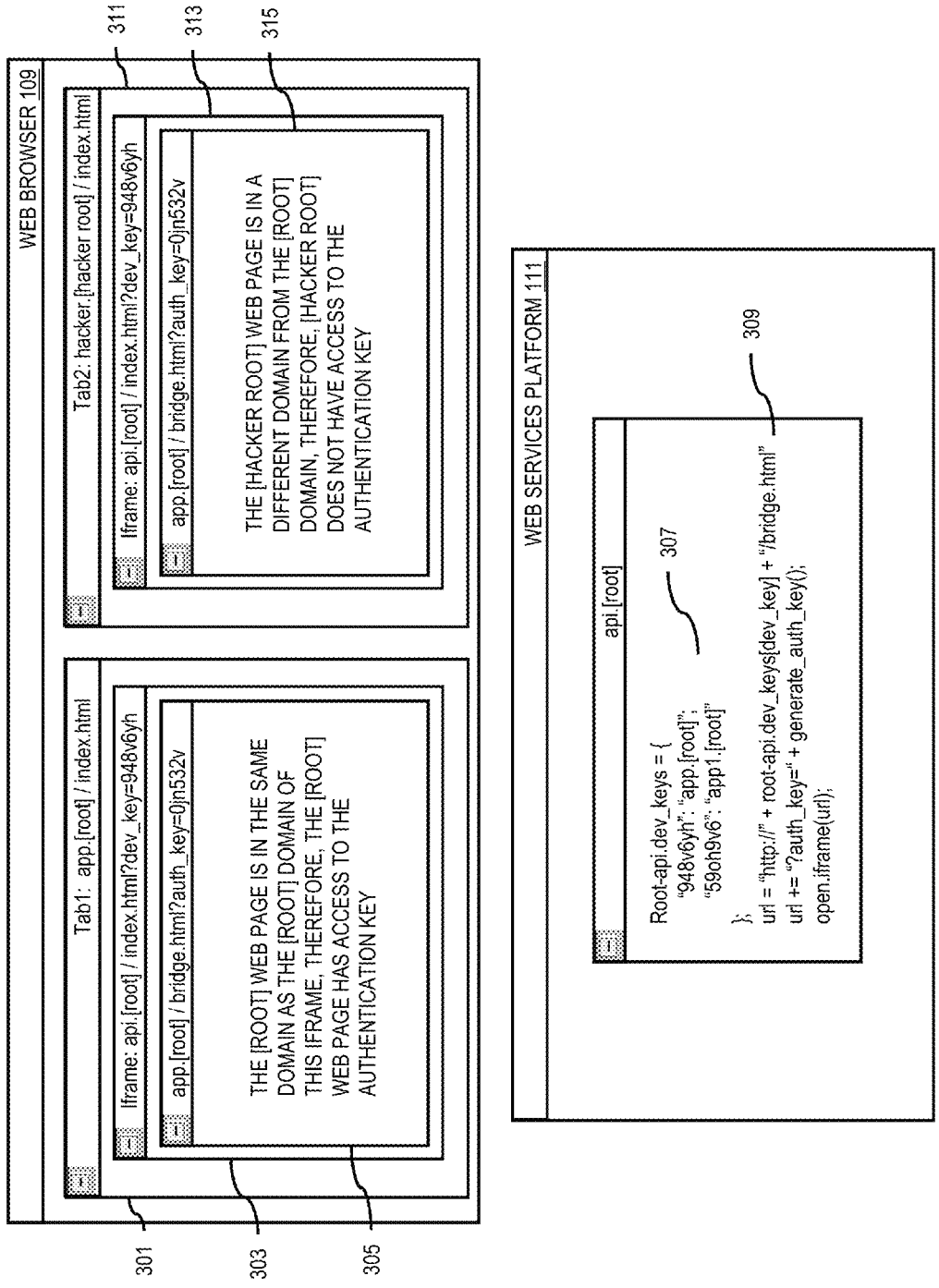
FIG. 3 is a diagram of tabs and frames associated with a web browser for providing access to secure cross-site scripting to a web services platform 111, according to one embodiment.

FIG. 3 is a diagram of tabs and frames associated with a web browser 109 for providing access to secure cross-site scripting to a web services platform 111, according to one embodiment. A user of the web browser 109 may utilize the web browser 109 to access a web page of the web content platform 103. As shown, a first tab 301 of the web browser 109 includes a web page from a first domain (e.g., app.[root]) that may be associated with the web content platform 103 and/or one or more applications (e.g., a sound application, a mail application, a games application, etc.). The first tab 301 includes a first iframe 303 calling the services of a service API 113 using a URL (e.g., api.[root]/index.html?dev_key=948v6yh). As shown, the URL includes a developer key (948v6yh) associated with the web page. The link can setup XSS with the second domain. As such, the second domain may utilize the developer key to determine a bridge URL to send information back to the web page. As noted above, the web services platform 111 may link the developer key to a bridge using database information 307 and generate a URL using modifiers 309 including a domain associated with the developer key. Further, the modifiers 309 may be assigned into a variable (e.g., URL) or directly called via an open.iframe( ) call. For example, the call may include open.iframe("[root]/path/bridge.html#"+data). The direct call approach provides for a more secure method of modifying the URL (e.g., it would be more difficult to modify using a debugger). Then, the web services platform 111 can cause the first iframe 303 to open a second iframe 305 with the generated URL. The second iframe 305 is in the same domain as the first tab 301, therefore, information may be freely passed from the second iframe 305 to the first tab 301. Further, the URL may include an authentication key that may be utilized for further communications between the first tab 301 and the web services platform 111. The authentication key may be utilized in place of the developer key in the first iframe 303 in the further communications.

In another embodiment, the same processes occur, however, another website of a third domain that is different from the first domain (e.g., hacker.[hacker root]) is called in a second tab web page 311. This may occur, for example, if an attacker sends an e-mail to the user with the web link and the user clicks on the link. Under this scenario, a first iframe 313 may be created to communicate with the web services platform 111, and the second iframe 315 may be created by the web services platform 111 to provide information back to the developer's website. In this scenario, however, because the second iframe 315 is based on the developer key and not the second tab web page 311 calling the first iframe 313, the domain of the second iframe 315 and the domain of the second tab web page 311 are different. Thus, the [hacker root] website is unable to access the authentication key and utilize more services from the web services platform 111.

Figure 4:
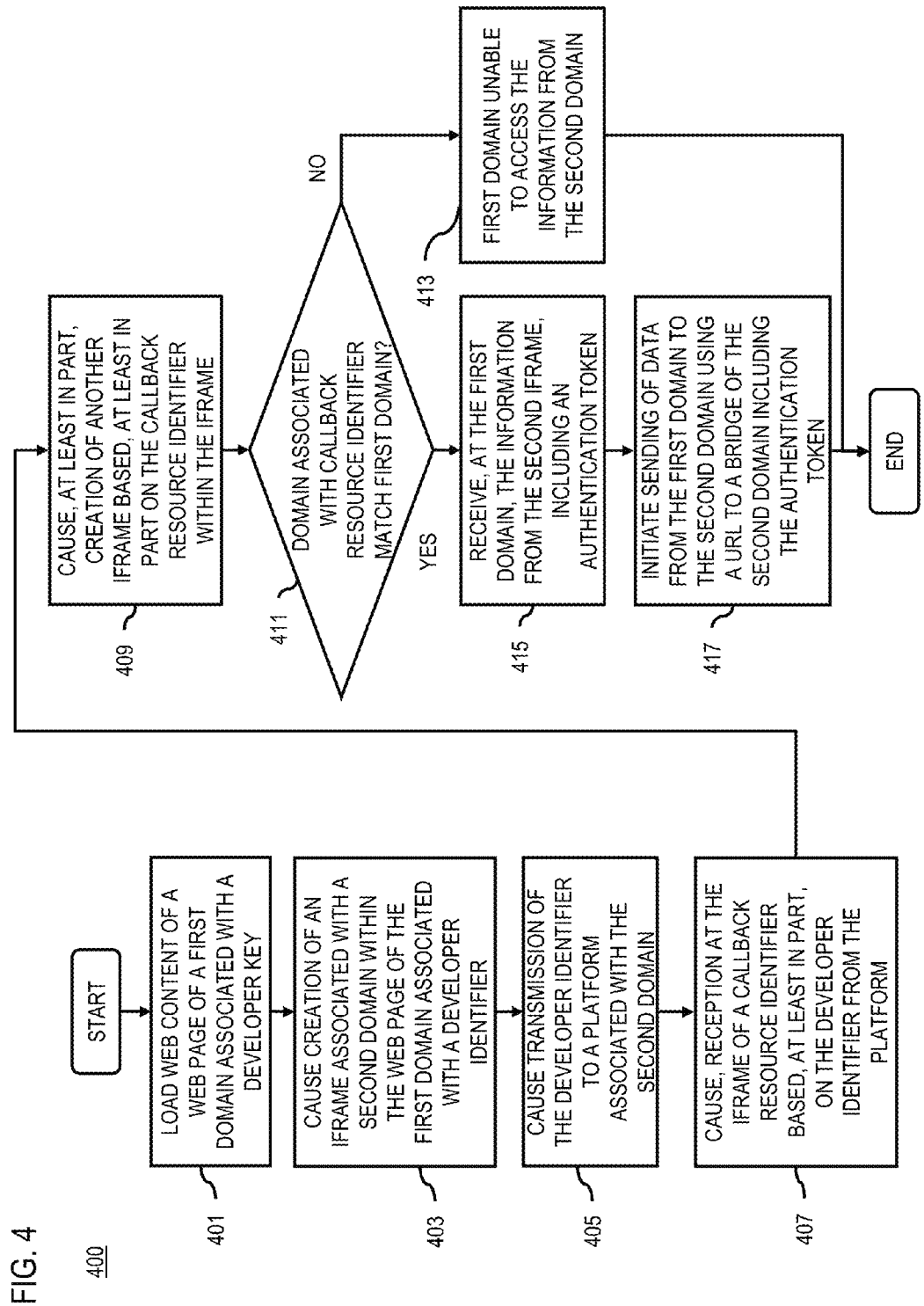
FIG. 4 is a flowchart of a process for providing cross-site scripting at a web browser, according to one embodiment.

FIG. 4 is a flowchart of a process for providing cross-site scripting at a web browser, according to one embodiment. In one embodiment, the web browser 109 performs the process 400 and is implemented in, for instance, a chip set including a processor and a memory as shown FIG. 8. As such, the web browser 109 can provide a means for implementing any of the steps of process 400. The user of a UE 101 may utilize the web browser 109 to navigate to a website. In step 401, web content of a web page of a first domain associated with a developer key is loaded. As previously noted, the web page may include code to cause the web browser 109 to create an iframe to load content, which may include scripts, from a service API 113.

Then, at step 403, the web browser 109 causes, at least in part, creation of an iframe within the web page of the first domain associated with a developer identifier (e.g., the developer key). As such, the web browser 109 provides a means for implementing step 403. The iframe can be associated with a second domain (e.g., the domain of the service API 113). As previously noted, the iframe may be utilized to provide content from the service API in the web page. For example, the web browser 109 may execute scripts on the iframe and present the content of the iframe. Then, at step 405, the web browser 109 determines to cause and causes, at least in part, transmission of the developer identifier to a web services platform 111 associated with the second domain. The communication may be in the form of utilizing a web URL from the web page to communicate with the second domain. The web URL may include additional information, such as developer identifier, user information, etc. in the URL. This may be utilized to provide the web services platform 111 with the developer identifier and/or user information. In certain embodiments, the user may be pre-authenticated with the web services platform 111 using a single sign-on technique at a web service portal 201 associated with the second domain. This sign-on information may be stored in a memory associated with the web browser (e.g., a cookie). As such, the iframe is able to retrieve the sign-on information from the web browser 109 without need to re-authenticate the user. Then, the web services platform 111 performs processes, as further detailed in FIG. 5 utilizing the information.

The web browser 109 provides means for determining to cause and causing, at least in part, reception at the iframe of a callback resource identifier from the web services platform 111 (step 407). As mentioned in the processes of FIG. 5, the callback resource identifier is determined based, at least in part on the developer identifier. Further, because the iframe is associated with the second domain, the iframe is unable to directly communicate with the web page using scripts. Thus, the iframe causes, at least in part, creation of another iframe within the iframe to attempt to communicate with the web page (step 409). The other iframe is based, at least in part, on the received callback resource identifier. Because the other iframe's domain is based on the developer identifier, it is not guaranteed that the domain of the other iframe is the same domain as the web page. The other iframe may have instructions from the second domain to provide service data to the web page. As noted previously, this provides a measure of security for providing the service API 113 to provide the service data to the developer domain. While attempting to execute this instruction, the web browser 109 determines whether the domain is associated with the callback resource identifier matches the first domain (step 411).

If the content of the other iframe is associated with a third domain different from the first domain, the web page of the first domain is unable to access the service data from the second domain (step 413). In this way, the web browser 109 may detect an attempt to access the service data at the web page or an attempt to provide the service data to the web page. Then, based on the determination that the domains do not match, the web browser 109 can return an error message associated with the attempt. In certain embodiments, this error message may be displayed to the user via the web browser 109 and may further conspicuously notify the user that the error may have been caused by an attempt to hack the user's computer for information. Alternatively or additionally, scripts executing on the first domain may not be provided an error message from the iframe of the third domain. In other scenarios, the error can be handled by scripts of the first domain using a timeout signal or a check to determine connectivity to the API. As such, when the timer expires, an error signal may be produced to trigger an error message to be presented on the web page.

If the content of the other iframe is associated with the first domain, the other iframe may be utilized by the web services platform 111 to indicate to the web browser 109 that the service data should be provided to the web page. Thus, the service data can be accessed at the web page of the first domain (step 415). Further, the web page may utilize this service data in other portions of the web page (e.g., by calling yet another iframe associated with other content and providing the service data or by displaying the service data on the web page or otherwise using the service data). Moreover, the received service data may include an authentication token generated by the web services platform 111 as detailed in FIG. 5.

The authentication token may then be utilized to cause, at least in part, sending of data from the web page of the first domain to the second domain (e.g., the web services platform 111) using a URL to create a bridge of the second domain including the authentication token (step 417). The data can be determined by the web browser 109 according to instructions from the web page. In certain embodiments, the base URL is the same base URL as used in the initiation of the iframe and augmented based on the authentication token. In other embodiments, the URL may be passed as part of the service data. Further, the base URL may be used to generate another resource identifier based, at least in part, on the authentication token and the data to be sent. The data to be sent may be a call to the API of the web services platform 111 as well as parameters associated with the call. Thus, the URL may include the call as part of the URL. Then, the web browser 109 is caused, at least in part, by the web page (e.g., via a script executing on the web page) to update a location identifier of the iframe with the generated other resource identifier. Then, because the location identifier is updated, the web browser 109 is automatically caused to reload the iframe, causing the content information to be sent to the second domain.

In another embodiment, the iframe may receive an instruction from the second domain to stop execution of scripts on in the iframe. This may be included in the service data and/or as part of the callback resource identifier. Further, this provides the web services platform 111 with an option to stop the scripts associated with a developer identifier based on one or more reasons (e.g., information that the web page associated with the developer is misbehaving).

Figure 5:
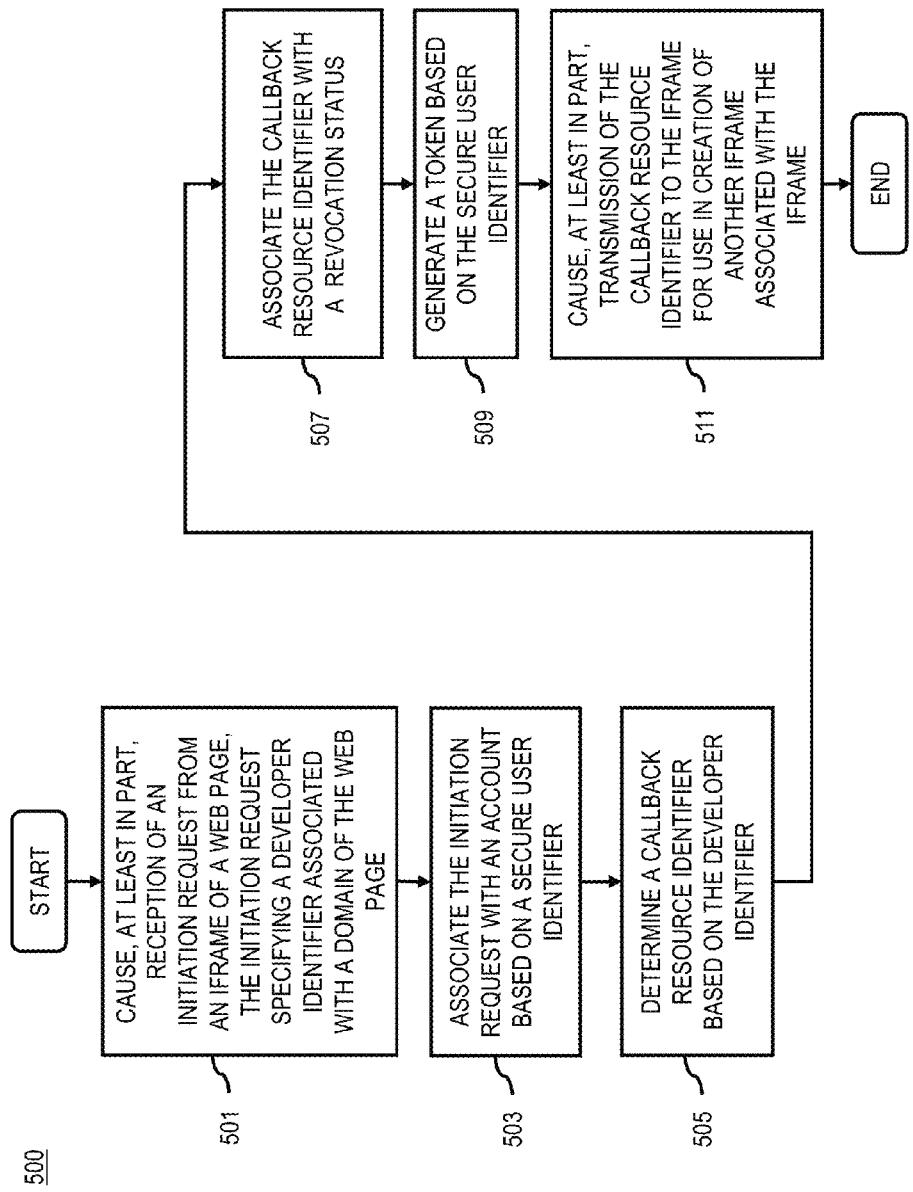
FIG. 5 is a flowchart of a process for providing cross-site scripting, according to one embodiment.

FIG. 5 is a flowchart of a process for providing cross-site scripting, according to one embodiment. In one embodiment, the control logic 205 performs the process 500 and is implemented in, for instance, a chip set including a processor and a memory as shown FIG. 8. Additionally one or more of the components of the web services platform 111 can provide a means for implementing the steps of process 500. In step 501, the control logic 205 causes, at least in part, reception of an initiation request from an at least a first iframe of at least one web page. The initiation request can specify a developer identifier associated with a domain of the at least one web page. Additionally, the initiation request may further specify a user identifier (e.g., a secure user identifier associated with a single sign-on or other form of authentication).

The control logic 205 can be a means to associate the initiation request with an account based on the secure user identifier (step 503). As noted earlier, the account manager 203 may provide means for associating the account with the request. Further, information associated with the account may be part of service data to be provided to the web page or may be presented using scripts (e.g., in the iframe).

Additionally, the control logic 205 and key repository 115 can be a means for determining a callback resource identifier based on the developer identifier (step 505). As previously noted, a callback resource identifier can be associated with the developer identifier in the key repository 115. Optionally, in certain embodiments, the callback resource modifier is associated with a revocation status (step 507). The revocation status may be a status identifier associated with the scripts provided by the API to the web page to indicate to the iframe to stop all scripts.

Thus, the web services platform 111 reserves the right to revoke access to the scripts. The service API 113 of the web services platform 111 and/or service portal 201 may be utilized to receive comments about developers. As such, the comments may include information that the scripts executing on the domain of the developer identifier are misbehaving or the developer is otherwise untrustworthy. In certain embodiments, these comments are received using the domain as the identifier. Then, the control logic 205 can update the key repository 115 based on the information.

Further, the control logic 205 can be a means to generate a token based on the secure user identifier as previously mentioned (step 509). The secure user identifier and a random element (e.g., a time stamp) may be combined to generate the token. The token can be saved (e.g., to the key repository 115) and linked to the developer identifier and a current session with the user. In future communications between the web page and the web services platform 111, the token may be utilized as part of an authentication key to link the communications to the session. In certain embodiments, the callback resource identifier may be updated with the token and/or revocation status. Additionally or alternatively, service data may be generated to include the token, revocation status, other information (e.g., account information, content information, etc.), or a combination thereof. In certain embodiments, the control logic 205 checks the revocation status and determines that the access to scripts on the iframe. Then, the control logic 205 can send instructions to the iframe to stop all scripts on the iframe.

Next, at step 511, the control logic 205 may be a means to determine to cause and cause, at least in part, transmission of the callback resource identifier to the iframe for use in creation of another (e.g., a second) iframe associated with the iframe. As previously noted, the control logic 205 generates instructions to the iframe to cause the creation of the other iframe to pass information to the web page. Moreover, as previously noted, the callback resource identifier may include the token (e.g., authentication key). Further, the service data can be provided as part of the other iframe (e.g., as part of the callback resource identifier of the other iframe). The, further communications from the web page to the control logic 205 can be via the iframe with an updated location identifier including the token. As noted above, the updated location identifier may be a URL of the domain of the web services platform 111 further including the token.

Figure 6:
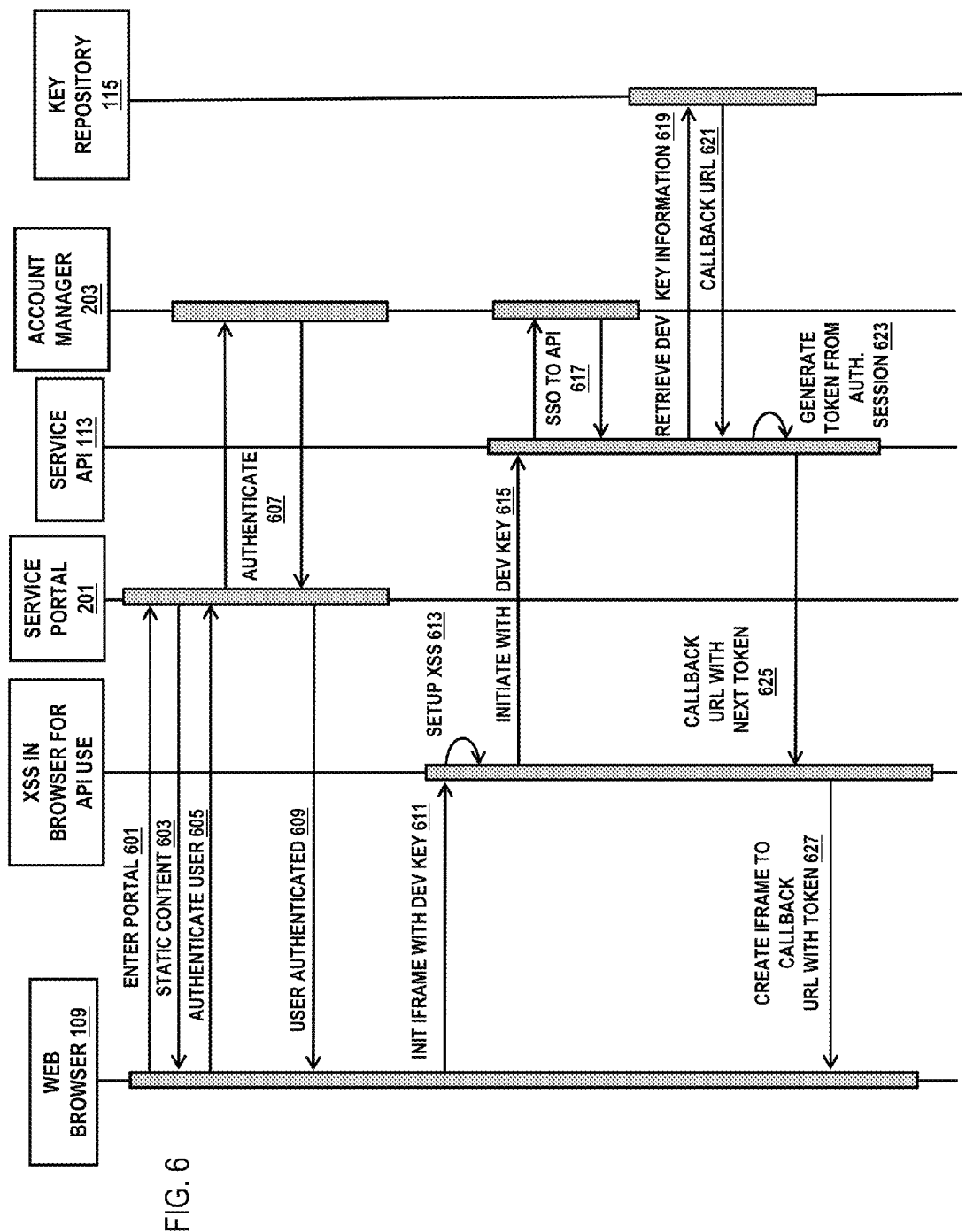
FIG. 6 is a ladder diagram of processes for providing cross-site scripting for web browsers, according to one embodiment.

FIG. 6 is a ladder diagram of processes for providing cross-site scripting for web browsers, according to one embodiment. A network process on the network is represented by a shaded vertical box. A message passed from one process to another is represented by horizontal arrows. A step performed by a process is indicated by the text. The processes represented in FIG. 6 include the authentication of a user via a service portal and the use of iframes for secure XSS between a web page loaded in a web browser 109 and a web services platform 111 associated with a different domain.

At step 601, the user of the web browser 109 navigates to a service portal web page that includes a sign-on for the web services platform 111. The service portal web page may be hosted by the service portal 201. The service portal 201 provides the user with static content (e.g., content provided to each user that arrives at the service portal web page) (step 603). The static content may be provided over a content delivery network. Then, at step 605, the web browser 109 provides authentication information to the service portal 201 associated with the user. The authentication information may include a user name and password the user has with the web services platform 111. If no account is found for the user, the user may be prompted to create an account and then authenticate access to the account. Then, the service portal 201 provides the authentication information to an account manager 203 that has access to a database including the authentication credentials of the user, other user information, and what services the user has access to. Based on the authentication credentials, the account manager 203 can generate a secure user identifier (e.g., a hash of the user authentication information and a key (e.g., based on a time stamp)) and provide the secure user identifier to the service portal 201 (step 607). Next, the web browser 109 receives a message that the user has been authenticated (step 609). In one embodiment, the message may include the secure user identifier.

Later, the user may navigate to a web page of a developer in another domain from the service portal 201. The web page may include instructions to access content from the web services platform 111 and present the content on the web page. The web browser 109, at step 611 initiates the creation of an inline frame using a developer key (e.g., a developer identifier). The web browser 109 then sets up XSS at step 613. The XSS in the browser 109 for API use may be the inline frame associated with the domain of the service API 113. This may be implemented by sourcing information from the service API 113 of the web services platform 111. Then, at step 615, the web browser 109 sends a request to initiate, with the developer key, a communication channel with the service API 113. The request may be a web URL executed by the web browser in the iframe, the web URL including the developer key. Further, the iframe may have access to the secure user identifier. Then, the service API 113 accesses the secure user identifier to associate the initiated session with the user. This may be accomplished by sending the secure user identifier to the account manager 203 to retrieve sign-on information about the user (step 617).

Next, at step 619, the service API 113 retrieves information associated with the developer key from the key repository 115 (step 619). The associated information may include one or more callback resource identifiers. Then, at step 621, the service API 113 receives the callback resource identifier associated with the developer key. An example of the callback resource identifier may be "[root domain 1]/bridge." As mentioned earlier, the callback resource identifier may be associated with a revocation status for disabling scripts executing on the iframe. This may be further appended as additional information.

Further, at step 623, the service API 113 generates a token to associate the developer key, user information, and/or initiated session. This token may additionally include a random element (e.g., based on a time stamp or other selected information) to facilitate, for instance, generation of unique tokens. The token and the callback resource identifier may then be provided to the web browser 109 at the iframe (step 625). The web browser 109 can then receive an instruction to create another iframe to the callback resource identifier with the token included (step 627). The other iframe may be used as a bridge to send information from the service API 113 to the web browser 109 and the web page. In one embodiment, the resource identifier may include a [root domain], a bridge, and fragment data to provide the communication information. An example of the resource identifier may be [root domain 1]/bridge/#{JSONDATA}. In this example, the JSONDATA may include the service data, the token, and other content that may be transferred from the domain of the service API 113 to the domain of the web page (the first domain). Further, in some embodiments, the JSONDATA may be split into smaller fragments and sent in multiple data transfers. This can be useful in data transfers because web browsers may have restrictions to the length of URLS. In certain embodiments, the token is provided to the web browser as part of the service data.

With the above approaches, developers of web pages may securely provide content on their web pages while utilizing web services from different domains. Further, the web services can securely provide the web page developer with their content. For example, security features incorporated in the approach described herein include the creation of an iframe from the second domain to communicate with the first domain in the web browser based on a developer key. Because the developer key is independently linked to a developer domain, attempts to access content from the web services of the second domain at the first domain by an attacking entity not associated with the developer domain will fail. Further, additional communications other than the initialization of the service API 113 between the web page and the service API 113 cannot occur without an authentication token that cannot be read by the web page in the first domain unless the first domain is also the developer domain. Further, the web services may have the option to stop scripts associated with the web services from executing based on the developer key.

The processes described herein for providing secure cross-site scripting may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide secure cross-site scripting as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing secure cross-site scripting.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to secure cross-site scripting. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing secure cross-site scripting. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for secure cross-site scripting, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for to the UE 101.

The term "computer-readable medium" as used herein to refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
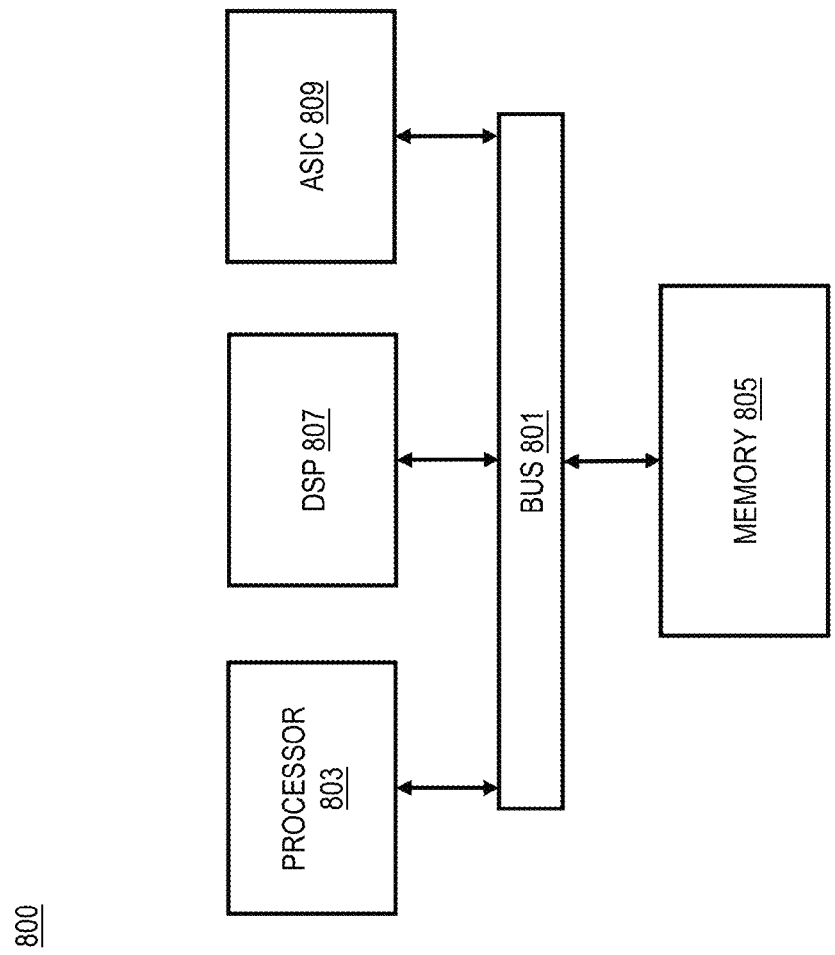
FIG. 8 is a diagram of a chip set that can be used to implement an embodiment of the invention.

FIG. 8 illustrates a chip set 800 upon which an embodiment of the invention may be implemented. Chip set 800 is programmed to provide secure cross-site scripting as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of providing secure cross-site scripting.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide secure cross-site scripting. The memory 805 also stores the data associated with or generated by the execution of the inventive steps.

Figure 9:
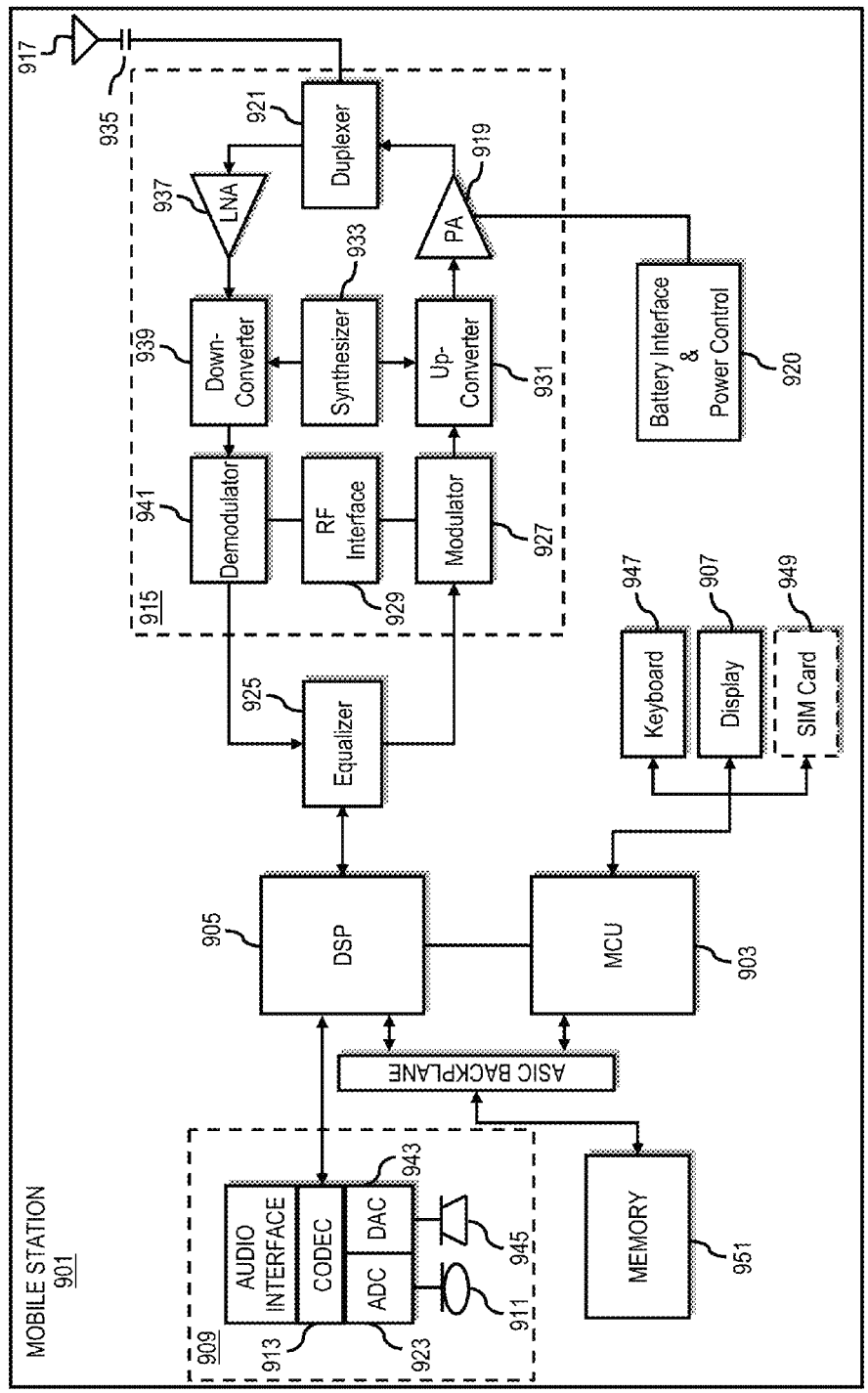
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing secure cross-site scripting. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing secure cross-site scripting. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide secure cross-site scripting. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, reception of an initiation request from at least a first inline frame of at least one web page, the initiation request specifying a developer identifier associated with a domain of the at least one web page;
   determining a callback resource identifier based on the developer identifier; and
   determining to cause, at least in part, transmission of the callback resource identifier to the at least the first inline frame for use in creation of at least a second inline frame associated with the at least the first inline frame.

2. A method of claim 1, wherein the initiation request further specifies a secure user identifier, the method further comprising:
   associating the initiation request with an account based on the secure user identifier;
   generating a token based on the secure user identifier; and
   determining to cause, at least in part, transmission of the token to the at least the first inline frame for use in the creation of the at least the second inline frame.

3. A method of claim 2, further comprising:
causing, at least in part, reception of a user identifier and authentication information;
generating the secure user identifier based on the user identifier and the authentication information; and
determining to cause, at least in part, transmission of the secure user identifier to the at least one web page.

4. A method of claim 2, further comprising:
causing, at least in part, reception of another request from the at least the first inline frame via a connection based, at least in part, on the token, wherein the request is for access to service data; and
authenticating the token to allow access to the service data.

5. A method of claim 1, wherein the callback resource identifier further includes a revocation status of the developer identifier.

6. An apparatus comprising:
at least one processor; and
at least one memory including computer program code,
the at least one memory and the computer program code configured to, with the at least one processor, cause the apparatus to perform at least the following,
cause, at least in part, reception of an initiation request from at least a first inline frame of at least one web page, the initiation request specifying a developer identifier associated with a domain of the at least one web page;
determine a callback resource identifier based on the developer identifier; and
determine to cause, at least in part, transmission of the callback resource identifier to the at least the first inline frame for use in creation of at least a second inline frame associated with the at least the first inline frame.

7. An apparatus of claim 6, wherein the initiation request further specifies a secure user identifier, and wherein the apparatus is further caused, at least in part, to:
associate the initiation request with an account based on the secure user identifier;
generate a token based on the secure user identifier; and
determine to cause, at least in part, transmission of the token to the at least the first inline frame for use in the creation of the at least the second inline frame.

8. An apparatus of claim 7, wherein the apparatus is further caused, at least in part, to:
cause, at least in part, reception of a user identifier and authentication information;
generate the secure user identifier based on the user identifier and the authentication information; and
determine to cause, at least in part, transmission of the secure user identifier to the at least one web page.

9. An apparatus of claim 7, wherein the apparatus is further caused, at least in part, to:
cause, at least in part, reception of another request from the at least the first inline frame via a connection based, at least in part, on the token, wherein the request is for access to service data; and
authenticate the token to allow access to the service data.

10. An apparatus of claim 6, wherein the callback resource identifier further includes a revocation status of the developer identifier.

11. A method comprising:
causing, at least in part, creation of an inline frame within a web page of a first domain associated with a developer identifier, wherein the inline frame is associated with a second domain;
determining to cause, at least in part, transmission of the developer identifier to a platform associated with the second domain;
causing, at least in part, reception at the inline frame of a callback resource identifier from the platform, wherein the callback resource identifier is determined based, at least in part, on the developer identifier; and
causing, at least in part, creation of another inline frame within the inline frame, wherein the other inline frame is based, at least in part, on the callback resource identifier.

12. A method of claim 11, wherein the content of the other inline frame is associated with the first domain.

13. A method of claim 12, wherein the other inline frame includes service data, the method further comprising:
causing, at least in part, accessing the service data at the web page of the first domain, wherein the service data includes a token for authenticating communications to the second domain.

14. A method of claim 12, further comprising:
determining content information to send to the second domain;
generating another resource identifier based, at least in part, on the token and the content information; and
updating a location identifier of the inline frame with the other resource identifier to send the content information.

15. A method of claim 11, wherein the content of the other inline frame is associated with a third domain different from the first domain and wherein the other inline frame includes service data, the method further comprising:
detecting an attempt to access the service data at the web page; and
returning an error message associated with the attempt.

16. An apparatus comprising:
at least one processor; and
at least one memory including computer program code,
the at least one memory and the computer program code configured to, with the at least one processor, cause the apparatus to perform at least the following,
cause, at least in part, creation of an inline frame within a web page of a first domain associated with a developer identifier, wherein the inline frame is associated with a second domain;
determine to cause, at least in part, transmission of the developer identifier to a platform associated with the second domain;
cause, at least in part, reception at the inline frame of a callback resource identifier from the platform, wherein the callback resource identifier is determined based, at least in part, on the developer identifier; and
cause, at least in part, creation of another inline frame within the inline frame, wherein the other inline frame is based, at least in part, on the callback resource identifier.

17. An apparatus of claim 16, wherein the content of the other inline frame is associated with the first domain.

18. An apparatus of claim 17, wherein the other inline frame includes service data, and wherein the apparatus is further caused, at least in part, to:
cause, at least in part, accessing the service data at the web page of the first domain, wherein the service data includes a token for authenticating communications to the second domain.

19. An apparatus of claim 17, wherein the apparatus is further caused, at least in part, to:
determine content information to send to the second domain;

generate another resource identifier based, at least in part, on the token and the content information; and update a location identifier of the inline frame with the other resource identifier to send the content information.

20. An apparatus of claim 16, wherein the content of the other inline frame is associated with a third domain different from the first domain and wherein the other inline frame includes service data, and wherein the apparatus is further caused, at least in part, to:

detect an attempt to access the service data at the web page; and return an error message associated with the attempt.

* * * * *